(No Model.)
H. E. PRIDMORE.
GRAIN BINDER.
No. 382,898. Patented May 15, 1888.
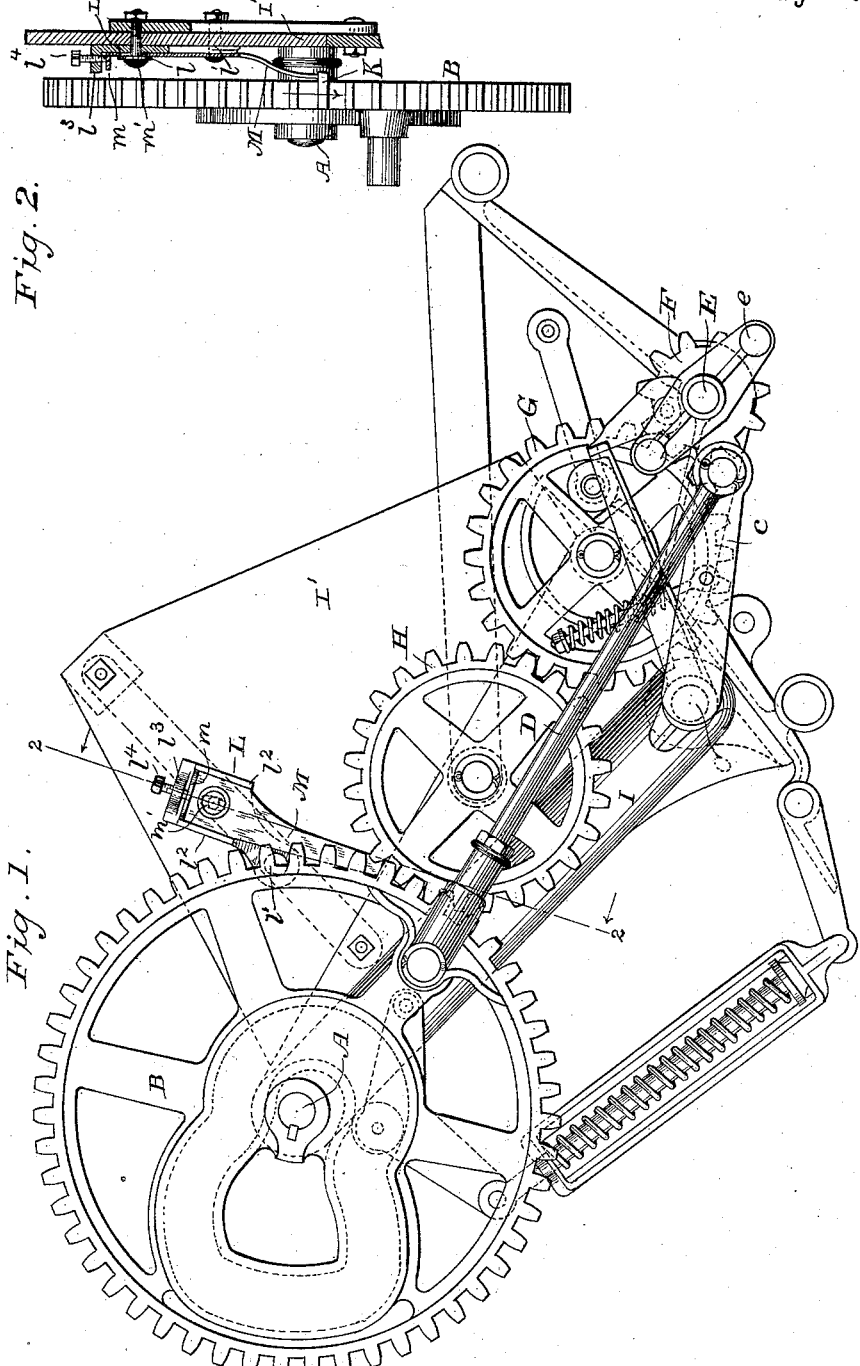
Witnesses.
Wm A. Skinkle
Geo. W. Young.
Inventor.
Henry E. Pridmore,
By his Attorneys
Parkinson & Parkinson.

UNITED STATES PATENT OFFICE.

HENRY E. PRIDMORE, OF CHICAGO, ILLINOIS, ASSIGNOR TO THE McCOR-
MICK HARVESTING MACHINE COMPANY, OF SAME PLACE.

GRAIN-BINDER.

SPECIFICATION forming part of Letters Patent No. 382,898, dated May 15, 1888.

Application filed December 7, 1886. Serial No. 220,878. (No model.)

*To all whom it may concern:*

Be it known that I, HENRY E. PRIDMORE, a citizen of the United States of America, residing at Chicago, in the county of Cook and State of Illinois, have invented certain new and useful Improvements in Grain-Binders, of which the following is a specification.

In order to prevent backlash in the grain-binding attachments of harvesters it has been customary heretofore to dog some part of the train of mechanism between the driver-shaft mounted on the harvester and the functional elements of the binder. Generally the part thus dogged against reverse motion has been the main shaft or the main gear, or gear and cam-wheel attached to that shaft, from which all said effective elements are driven. When applied to the gear and cam-wheel, as usual in the type most commonly employed nowadays, the dog has ordinarily, though not always, been a plate-spring bolted to the standard of the post-frame, or to a web or arm from said standard, and bent so as to throw it into the path of a ratchet-tooth on the inner side of the wheel, that it may be sprung aside by that tooth as it is brought around in the revolution of the wheel and fall behind it just at the instant that the wheel stops, so as to leave the dog in contact with the tooth and in position to bar reverse motion of the wheel, and consequently of all parts driven by it or operated by it, among them the binder-arm or needle, which in its position of rest through its pitman-connection with the wheel exerts a marked degree of leverage tending toward reverse motion. In every instance, so far as I am aware, where such a dog has been used either upon this wheel or upon the main shaft, or upon some other part it has occupied a fixed position, and when worn has had to be replaced by a new one; or when originally too short or too long has been useless and gone to the waste heap to be replaced by one of perfect fit. This latter contingency arises, it will be understood, from the fact that all or substantially all metal parts of the binder are fashioned, stamped, or bored, and prepared for assembling and uniting together by machinery, which supplants so far as possible manual labor in this art, as in others.

In my present invention I propose to make the dog adjustable, that its point may be set forward to take up wear, and yet in such manner that all the essential parts, including the dog itself, may, as heretofore, be fashioned and bored for bolt-holes and other means of attachment by machinery.

In order to a full understanding of my invention, however applied or at whatever point in the binder-train suitable to the prevention of backlash, it will be sufficient to describe it as applied to the gear and cam-wheel, and this I will proceed to do.

In the drawings, Figure 1 is an end elevation from the front of a binding attachment embodying my invention; and Fig. 2 is a detail, in section, on the correspondingly-numbered line of the first figure.

A represents the main shaft, sometimes called the "tyer-shaft" in the present general type of binders, and B the gear and cam wheel pinned or keyed upon one end of this shaft.

C is the binder-arm shaft having a crank, $c$, and connected by a pitman, D, with the gear and cam wheel, so that the binder arm or needle may be operated once in each revolution of the latter.

E is the driver-shaft mounted upon the harvester and having at its end opposite the gear and cam wheel a trip-clutch, $e$, which in the usual manner is caused to connect it with a loose pinion, F, and this by means of the idler G and a second pinion, H, gives a single revolution to the gear and cam wheel at each binding operation.

The main shaft, as heretofore, is mounted in an overhanging arm of the post-frame or standard, I, and from this post-frame a web, I', projects inwardly toward the harvester and supports the stub-axles for the idler and the pinion between it and the gear and cam-wheel.

As formerly constructed, machines of this type have had a plate-spring bolted directly to the web of the post-frame, or to a bar rigid therewith, in such position that just at the moment the gear and cam-wheel reached the end of its revolution it sprung behind a lug or tooth, K, on the inner face of said wheel, and guarded against reverse movement, the bolt-holes in the web or arm and in the spring being located and formed by machinery prior to the assembling of the parts, as already referred to in the preamble, thus preventing any nice fitting, and causing a very slight difference in length of the dog to insure its rejection or a little wear to render it unfit for further use.

In my present improvement I propose to bolt a chair, L, permanently to the metallic frame-work in the proper effective relation to the ratchet-tooth on the gear and cam-wheel, the bolt-holes $l\ l'$ of this chair, for its attachment to the frame, being of course bored, as are the corresponding bolt-holes in the frame, enabling it to be secured to the latter without any manual fitting when assembling. The chair has snugs $l^2$ at each side, and at one end—the end against which the heel of the dog rests—rises a lug, $l^3$, in which is mounted a set-screw, $l^4$, projecting inwardly parallel with the snugs. The dog M is formed as a plate-spring of practically the shape heretofore used, its shank being of such width as to fit closely between the snugs of the chair and to lie flat in the seat between said snugs, while at its heel end it is turned up or flanged, as at $m$, to about the height of the lug of said chair, so that the set-screw may press against it. Over that bolt-hole in the chair which is nearest the lug the shank of the dog is slotted longitudinally, as at $m'$, to admit the bolt, and yet allow the dog to be set forward or back, according to the adjustment of the set-screw. The parts, being thus constructed, may be assembled by passing a bolt through the hole in the open end of the chair and through the corresponding hole in the web, and binding chair and web together, then placing the dog in position and passing another bolt through the longitudinal slot in its shank, through the second hole in the chair, and through the web, but for the moment not clamping it against said dog. The gear and cam-wheel and other parts having then or previously been placed in position, it will be determined whether the nose of the dog drops behind the ratchet-tooth on the wheel at precisely the proper point to stay it against reverse movement from the point where it finishes its revolution. If not, the dog will either be set up against the tooth by turning the set-screw until the precise adjustment is reached or else will be retracted against the screw as the latter is taken in, according to circumstances. When, finally, the nose of the dog is found to be in the exact position for perfect action, the bolt which connects it and the rear end of the chair to the web will be tightened up, firmly clamping it, and this, with the set-screw pressing against the flanged heel of the dog, will suffice to maintain the adjustment until the wear of the machine or some extraneous cause necessitates a new adjustment, which can readily be made by the farmer or by any one operating the machine in the field.

It will be understood that I do not intend to limit myself to the precise location of the dog, nor to the exact details of proportion and construction herein shown and described; but What I do claim as my invention, and desire to secure by Letters Patent, is—

1. The combination, substantially as hereinbefore set forth, with the main gear in a binding attachment, of the ratchet-tooth on the inner face of said gear, the chair bolted to the adjacent frame, the longitudinally-slotted plate-spring seated in said chair, and the bolt passing through the slot in said spring, through the chair and frame, and serving to secure the three together, and the set-screw mounted in a lug on said chair bearing against the heel end of the spring.

2. The combination, substantially as hereinbefore set forth, of the chair L, having lateral snugs $l^2$, the plate-spring or dog having a longitudinal slot in its shank and an upturned flange at its heel end, the set-screw in the lug of the chair bearing against said flange, the bolt which unites the open end of the chair to the frame, and the bolt passing through the slot in the dog, through the chair near its lug end and through the frame, and uniting dog, chair, and frame.

HENRY E. PRIDMORE.

Witnesses:
PAUL ARNOLD,
W. R. SELLICK.